Patented Jan. 1, 1946

2,392,295

UNITED STATES PATENT OFFICE 2,392,295

PHOTOCHEMICAL PRODUCTION OF HALOGENATED THIO-ETHERS

Frederick F. Rust and William E. Vaughan, Berkeley, Calif., assignors to Shell Development Company, San Francisco, Calif., a corporation of Delaware No Drawing. Application June 28, 1941, Serial No. 400,344

11 Claims. (Cl. 204—158)

The present invention relates to a process for the preparation of organic sulfur-containing compounds, and more particularly to the production of halogenated thio-ethers by reacting mercaptans or halogenated mercaptans with symmetrical or unsymmetrical halogenated organic compounds containing unsaturated linkages of aliphatic character. In one of its more specific embodiments, the invention pertains to a novel method of effecting a controlled reaction between mercaptans or halogenated mercaptans and unsymmetrical halogenated organic compounds containing at least one unsaturated linkage of aliphatic character, i. e. an olefinic or acetylenic bond, to produce addition products of predetermined character. The invention provides a practical and economical method for the utilization of mercaptans and halogenated mercaptans to effect the conversion of halogenated organic compounds having at least one unsaturated linkage of aliphatic character, to valuable halogenated thio-ethers.

It is known that many of the halogenated thio-ethers have valuable insecticidal, germicidal, fungicidal, vesicatory, sternutatory and/or lachrymal properties. For example, beta-beta'-dichlor-diethyl thio-ether, commonly known as "Mustard gas," was the most important vesicant developed during World War I, while methyl beta-chlor-ethyl thio-ether is also known to have similar vesicant properties (see: Whitmore "Organic Chemistry," p. 161). Similarly, beta-beta'-dibrom-diethyl thio-ether, beta-beta'-dichlor-dipropyl thio-ether, beta-chlorethyl-methyl thio-ether, beta-chlorethyl-ethyl thio-ether, chlor-methyl ethyl thio-ether and beta-bromethyl butyl thio-ether are known to possess vesicant properties.

The manufacture of these and similar halogenated thio-ethers, however, is quite difficult and costly, usually necessitating the use of a plurality of steps and/or the cumbersome fractionation of the reaction mixture to separate the desired product therefrom. For instance, one of the known methods of producing mustard gas requires the treatment of ethylene monochlorhydrin with sodium sulfide, followed by a reaction between the resulting thioglycol and hydrogen chloride to produce the beta-beta'-dichlor-diethyl thio-ether. Another method comprises a high temperature reaction between ethylene and sulfur chloride, the resulting product containing free sulfur which is in a colloidal state so that its removal is quite difficult.

It is also known that thio-ethers, in general, may be produced by subjecting mixtures of suitable mercaptans and unsaturated organic compounds, e. g. unsaturated hydrocarbons, to elevated temperatures in the range of from about 200° C. to about 700° C. In some instances, such reactions were effected at superatmospheric pressures. When such reactions are effected under the outlined conditions of operation, the sulfur of the mercapto group or radical attaches predominantly to the unsaturated carbon atom holding the most hydrogen atoms. In other words, this addition takes place contrary to the course suggested by the Markownikoff rule, and is therefore designated as "abnormal" addition on the assumption that mercaptans should add like halogen acids. It is furthermore known that the abnormal addition of mercaptans to unsaturated organic compounds is catalyzed by free oxygen, air, ozone, peroxides, ascaridole, and the like, and that compounds of the type of hydroquinone and piperidine act as reaction inhibitors.

It has now been discovered that halogenated unsaturated organic compounds of the class more fully described hereinbelow may be reacted with halogenated or unhalogenated mercaptans to effect a rapid and efficient conversion of the halogenated unsaturates to halogenated thio-ethers, this reaction being substantially solely via abnormal addition and being effected in the absence of any compound or substance the presence of which was heretofore considered or deemed necessary for promoting or catalyzing the aforementioned abnormal addition reaction. Also, this conversion of the halogenated unsaturated organic compounds via abnormal addition to the corresponding halogenated thio-ethers is effected, according to the present process, without the necessity of resorting to high temperatures and/or elevated pressures.

Broadly stated, the present invention resides in a photo-chemical process of effecting the addition of the mercaptans under the deliberate influence of ultra-violet radiation, this reaction being effected at normal temperatures, i. e. in the range of from about 25° C. to about 15° C., or even at considerably lower temperatures. More particularly stated, the reaction is effected under the influence of light rays having a wave-length of below about 2900 to 3000 A. U. (Angstrom units). It has been still further discovered that these light rays strongly catalyze the photochemical addition of the mercaptans, this addition, in the absence of any compound or substance heretofore considered necessary for promoting or catalyzing such reaction, being preponderantly if not wholly via the above-defined "abnormal" addition, and therefore in accordance with the rule proposed by Posner [Berichte, 38, 646 (1904)]. Therefore, the photo-chemical reaction taking place under the deliberate influence of ultra-violet radiations offers a direct, efficient and very rapid method for obtaining primary thio-ethers from halogenated hydrocarbons containing a terminally unsaturated carbon atom.

The halogenated unsaturated organic compounds to which the invention is particularly applicable include halogenated hydrocarbons containing one or more olefinic and/or acetylenic linkages. These compounds may contain one or more halogen (i. e. chlorine, bromine, iodine and/or fluorine) atoms which may be attached to saturated and/or unsaturated carbon atoms of the compound. Examples of such halogenated hydrocarbons are: vinyl halides, allyl halides, 2-halo-propylene, crotyl halides, iso-crotyl halides, 4-halo-butene-1, methallyl halides, 2-halo-butene-2, monohalogenated acetylenes, propargyl halides, 1,1-dihalo-ethylene, trihalo-ethylene, 3-halo-pentene-1, 3-halo-cyclohexene, 2-halo-1,4-diphenyl-butene-2, 3-halo-pentadiene-1,4 and their homologues. The above class of halogenated compounds may be further substituted in the nucleus and/or in the substituents in various degrees by straight-chain, branched-chain, carbocyclic and/or heterocyclic radicals, and by such substituents as alkoxy, alkenoxy, alkyloxy, araloxy, alkylimido, and the like. Also, the organic compounds of the above class may contain two or more halogen atoms which may be attached to saturated and/or unsaturated carbon atoms.

The invention is particularly applicable to the reaction of mercaptans or halogenated mercaptans with partially halogenated unsaturated hydrocarbons having a terminal unsaturated linkage of aliphatic character, and especially with halogenated unsaturated hydrocarbons in which the terminal carbon atom is unsaturated and carries a greater number of hydrogen atoms than the adjoining unsaturated carbon atom. When such unsaturates are reacted with a mercaptan according to the process of this invention, i. e. photo-chemically and under the influence of ultra-violet radiations, the reaction product predominates in or consists of halogenated primary thio-ethers.

Any sufficiently stable mercaptan or halogenated mercaptan is suitable as a reactant to be employed in the photo-chemical addition thereof to the defined class of the halogenated unsaturated organic compounds. A suitable mercaptan may contain one or more sulfhydryl groups or radicals, and be of alkyl, aralkyl, alkenyl, aralkenyl or aryl character and comprise the mercapto radical linked to an aliphatic or aromatic carbon atom. In the majority of cases, it is preferable to employ the normal or iso-alkyl chain mercaptans of primary, secondary or tertiary character, particularly those contained or derived from petroleum and petroleum products. The methyl, ethyl, butyl, amyl, hexyl, heptyl, octyl and similar mercaptans, as well as their homologues and halogenated substitution products, may be employed with excellent results.

Another group of mercaptans which may be employed as one of the two reactants comprises or includes the dimercaptans, and particularly the polymethylene dimercaptans of the general formula $HS(CH_2)_nSH$. This group of mercaptans may be reacted with, for example, halogenated aliphatic hydrocarbons containing a plurality of unsaturated linkages to produce halogenated thio-ethers having a high molecular weight. A particularly suitable group of halogenated unsaturated organic compounds which may be employed with these dimercaptans includes the halogenated unsaturated compounds containing unsaturated linkages of aliphatic character in alpha and omega positions (i. e. in terminal positions). Due to the "abnormal" addition reaction, the resulting products predominate in or consist of halogenated mercapto thio-ethers and halogenated poly-thio-ethers. For example, 2-chlor-butadiene-1,3 may be thus reacted with a n-tetramethylene dimercaptan to product normal, halogenated polyalkylene thiols having the general formula R—S—R'—S—R, wherein R' is a monochlorinated n-tetramethylene radical and each R represents a mercapto and/or thio-ether derivative of the reactants. Instead of employing straight chain, partially halogenated poly-unsaturated hydrocarbons, it is also possible to use branched chain halogenated compounds, provided they contain one or more unsaturated linkages of aliphatic character. The poly-unsaturated halogenated organic compounds may or may not be unsaturated in terminal positions.

The reaction of the mercaptans (which term also includes halogenated mercaptans and polymercaptans, such as the mentioned polymethylene dimercaptans) with the above-defined class of halogenated unsaturated organic compounds under the influence of ultra-violet radiations may be effected in the vapor or liquid phase, or in a two-phase liquid-vapor system. Since the abnormal addition of the mercaptan according to the present process occurs photo-chemically, no heating is necessary. In fact, although the reaction may be realized at atmospheric temperatures, i. e. between about 15° C. and about 25° C., it may frequently be effected at temperatures as low as 0° C., and even considerably below this temperature. For example, good results may be attained by employing temperatures of —75° C., and even lower. The reaction temperature, however, must be above that at which the reactants solidify. Although the photo-chemical reaction may be effected at any pressure, it is preferable to employ superatmospheric pressures which are at least sufficient to maintain the reactants in a liquid phase. This is because the conversion rate appears to be accelerated when the reaction is effected in the liquid phase.

Although the reaction described herein may be promoted by using the whole range of ultra-violet rays, the most effective wave-lengths of light which catalyze the desired addition of mercaptans appear to lie in that portion of the spectrum which is below about 3200 A. U. and more particularly in the region of about 2900 A. U. and below. In fact, the interposing of an ordinary window glass filter (which has a lower limit of transmission of about 3300 A. U.) or of a Pyrex glass filter having a low transmission limit of about 2900 A. U. to 3000 A. U., in the path of light coming from a source emitting ultra-violet radiations, will cause a substantial if not complete inhibition of the reaction unless some sensitizing material, such as an organic peroxide, is added. On the other hand, the use of quartz vessels for the reaction allows efficient addition of the mercaptans due to the fact that quartz transmits ultra-violet rays considerably below 2900 Angstrom units.

The reaction may be effected in a batch, intermittent or continuous manner. When effected by a batch method, the reactants may be conveyed into a suitable container, these reactants being maintained in the container either in a liquid or a vapor state, or in a mixed liquid-vapor state. The container may then be illuminated with ultra-violet light for a period of time sufficient to effect the desired addition reaction. Since ordinary glass or Pyrex glass will not permit the substantial transmission of the effective light waves, namely those in the neighborhood of 2900 to 3000 A. U. and below, it is preferable to construct the container of quartz or other suitable light-transmitting materials, such as calcium fluoride, or at least to provide these containers wtih one or more openings or windows of quartz, calcium fluoride, or the like, through which the reactants in the interior of the container may be illuminated with ultra-violet rays. In case of a continuous process the reactants, such as the mercaptan and the halogenated unsaturated hydrocarbon, may be conveyed, in a liquid, vapor or mixed state, through the interior of a reaction chamber which may be of a sufficient length to permit an adequate residence time for the reactants. These reactants may be subjected to ultra-violet radiations emanating from a source or sources disposed within or without the reaction chamber. In the former case, the reactor may be constructed of any material which is impervious to light, such as steel or the like, the source of the ultra-violet radiations being disposed within the chamber and in the path of the reactants passing therethrough. The discharged reaction products may then be treated by any known or suitable means or methods for the separation of the desired halogenated thio-ethers from the unreacted materials.

The above described invention may be readily applied to the production of compounds of the type of beta-beta'-dichlor-diethyl thio-ether. This may be effected, for example, by mixing substantially equimolecular amounts of vinyl chloride and beta-chlor-ethyl mercaptan, and by subjecting this mixture in a liquid state, in a quartz reactor and at room temperature or at lower temperatures, to ultra-violet rays emanating from a quartz mercury arc lamp. After a relatively short reaction period, the reaction mixture shows a substantially quantitative conversion to the above thio-ether. On the other hand, when the same reactants are maintained in the dark under identical pressure and temperature conditions, only very small yields of the desired chlorinated thio-ether are obtained, thus showing that ultra-violet radiations, and particularly those having wave-lengths of about 2900 to 3000 A. U. and below, effectively promote the "abnormal" addition of mercaptans or halogenated mercaptans to halogenated unsaturated organic compounds, such as halogenated olefins. Instead of using mercaptans and halogenated olefins, halogenated thio-ethers may also be obtained by subjecting mixtures of halogenated mercaptans and unsubstituted olefins to the described action of ultra-violet rays.

We claim as our invention:

1. In a process of producing beta-beta'-dichlor-diethyl thio-ether, the steps of mixing substantially equimolecular amounts of vinyl chloride and beta-chlor-ethyl mercaptan, maintaining the reactants in a liquid state and at a temperature not in excess of 25° C., and subjecting the reactants to the influence of light rays having wave-lengths below 3000 Angstrom units.

2. In a process of producing beta-beta'-dichlor-diethyl thio-ether, the steps of contacting vinyl chloride with beta-chlor-ethyl mercaptan, maintaining the reactants at a temperature not in excess of 25° C., and subjecting the reactants to the influence of light rays having wave-lengths below 3000 Angstrom units.

3. In a process of producing halogenated thio-ethers, the steps of mixing a saturated halogenated mercaptain with a halogenated alpha-unsaturated aliphatic hydrocarbon, maintaining the reactants substantially in a liquid phase and at a temperature not in excess of about 25° C., and effecting a reaction therebetween under the influence of light rays having wave-lengths of below 3000 Angstrom units.

4. In a process of producing halogenated thio-ethers, the steps of reacting a mercaptan with a halogenated unsaturated aliphatic hydrocarbon, maintaining the reactants at a temperature not in excess of about 25° C., and effecting the reaction under the influence of light rays having wave-lengths of below 3000 Angstrom units.

5. In a process of producing halogenated thio-ethers, the steps of contacting a halogenated unsaturated hydrocarbon having at least one unsaturated linkage between two carbon atoms of aliphatic character with a mercaptan, maintaining the reactants at a temperature not in excess of about 25° C., and subjecting the reactants to the influence of light rays having wave-lengths of below 3000 Angstrom units.

6. The process according to claim 5 wherein the halogenated unsaturated hydrocarbon is reacted via addition with a saturated mercaptan.

7. In a process of producing halogenated thio-ethers, the steps of contacting a halogenated organic compound containing at least one unsaturated linkage between two carbon atoms of aliphatic character with a halogenated mercaptan, maintaining the reactants at a temperature not in excess of about 25° C., and subjecting the reactants to the influence of light rays having wave-lengths of below 3000 Angstrom units.

8. In a process of producing halogenated thio-ethers, the steps of contacting a halogenated organic compound containing at least one unsaturated linkage between two carbon atoms of aliphatic character with a mercaptan, maintaining the reactants at a temperature not in excess of about 25° C., and subjecting the reactants to the influence of light rays having wave-lengths of below 3000 Angstrom units.

9. In a process for the production of halogenated thio-ethers, the step of reacting a halogenated unsaturated organic compound containing at least one unsaturated linkage between two carbon atoms of aliphatic character with a compound selected from the class consisting of mercaptans and halogenated mercaptans, under the deliberate influence of light rays having wave-lengths of below 3000 Angstrom units and at approximately atmospheric temperature.

10. In a process of producing halogenated thio-ethers, the steps of contacting a compound selected from the class consisting of unsaturated organic compounds and partially halogenated derivatives thereof which compounds contain at least one unsaturated linkage between two carbon atoms of aliphatic character with a compound selected from the class consisting of mercaptans and halogenated mercaptans, at least one of said reactants being a halogenated compound, and subjecting the reactants to the deliberate influence of ultra-violet radiations having wave-lengths of below 3000 Angstrom units and at a temperature not in excess of about 25° C.

11. In a process for the production of halogenated thio-ethers, the step of reacting a halogenated unsaturated organic compound containing at least one group of two carbon atoms of aliphatic character having an olefinic linkage therebetween, with a compound selected from the class consisting of mercaptans and halogenated mercaptans at a temperature not in excess of about 25° C. while subjecting the reactants to the deliberate influence of light rays having wave-lengths below 3000 Angstrom units.

FREDERICK F. RUST.
WILLIAM E. VAUGHAN.